United States Patent [19]
Draaijer et al.

[11] Patent Number: 5,987,463
[45] Date of Patent: Nov. 16, 1999

[54] APPARATUS AND METHOD FOR CALLING EXTERNAL ROUTINES IN A DATABASE SYSTEM

[75] Inventors: Jacco Draaijer; Roger Bodamer, both of Mountain View; Eric Voss, Foster City, all of Calif.

[73] Assignee: Oracle Corporation, Redwood Shores, Calif.

[21] Appl. No.: 08/880,326

[22] Filed: Jun. 23, 1997

[51] Int. Cl.⁶ ................................................. G06F 17/30
[52] U.S. Cl. ........................... 707/10; 707/100; 707/103
[58] Field of Search ........................... 364/200; 707/536, 707/10, 9, 8, 100, 103

[56] References Cited

U.S. PATENT DOCUMENTS

| | | | |
|---|---|---|---|
| 4,736,321 | 4/1988 | Brown et al. | 364/300 |
| 4,949,255 | 8/1990 | Gerth et al. | 364/200 |
| 5,257,366 | 10/1993 | Adair et al. | 707/4 |
| 5,416,917 | 5/1995 | Adair et al. | 707/203 |
| 5,452,450 | 9/1995 | Delory | 707/10 |
| 5,455,948 | 10/1995 | Poole et al. | 707/102 |
| 5,524,253 | 6/1996 | Pham et al. | 709/202 |
| 5,539,886 | 7/1996 | Aldred et al. | 395/200.04 |
| 5,542,078 | 7/1996 | Martel et al. | 707/101 |
| 5,596,744 | 1/1997 | Dao et al. | 707/10 |
| 5,608,874 | 3/1997 | Ogawa et al. | 709/246 |
| 5,617,533 | 4/1997 | Wu et al. | 395/183.14 |
| 5,627,972 | 5/1997 | Shear | 709/246 |
| 5,651,111 | 7/1997 | McKeeman et al. | 395/183.14 |
| 5,655,116 | 8/1997 | Kirk et al. | 707/1 |
| 5,706,499 | 1/1998 | Kleewein et al. | 707/10 |
| 5,710,918 | 1/1998 | Lagarde et al. | 707/10 |
| 5,713,014 | 1/1998 | Durflinger et al. | 707/4 |
| 5,721,904 | 2/1998 | Ito et al. | 707/8 |
| 5,745,754 | 4/1998 | Lagarde et al. | 707/104 |
| 5,764,949 | 6/1998 | Huang et al. | 707/102 |
| 5,768,577 | 6/1998 | Kleewein et al. | 707/10 |
| 5,768,589 | 6/1998 | Bradley et al. | 709/304 |
| 5,787,452 | 7/1998 | McKenna | 707/536 |
| 5,794,234 | 8/1998 | Church et al. | 707/4 |
| 5,806,066 | 9/1998 | Golshani et al. | 707/100 |
| 5,859,972 | 1/1999 | Subramaniam et al. | 709/203 |

*Primary Examiner*—Wayne Amsbury
*Assistant Examiner*—Cheryl R. Lewis
*Attorney, Agent, or Firm*—McDermott, Will & Emery

[57] ABSTRACT

An apparatus and method for accessing foreign processes in a heterogeneous database environment includes a local database server having a heterogeneous services module to selectively send requests to the foreign processes based on their respective capabilities. A client application sending a statement to the local database server is checked by the local server process to determine if the statement includes a reference for a registered external routine executable by an agent process in an address space separate from the local server process. The heterogeneous services module selectively initiates a network connection with an external agent process, and the external agent process executes the external routine by accessing a dynamically linked library. If necessary, the local database server and the agent process exchange callback queries and callback results via the heterogeneous services module to complete intermediate queries within the same user instance. The local database server then completes the client statement based on the results received from the agent process. Use of a link to an external agent process executing in a separate address space enables the local server process to use enhanced external routines written in third generation languages, without risking the local server process to failures in the external routines.

22 Claims, 6 Drawing Sheets

APPARATUS AND METHOD FOR CALLING EXTERNAL ROUTINES IN A DATABASE SYSTEM

CROSS-REFERENCE TO RELATED APPLICATIONS

This application is related to commonly-assigned, application Ser. No. 08/880,333 filed Jun. 23, 1997, entitled "Apparatus and Method for Accessing Foreign Databases in a Heterogeneous Database System," pending, inventors Roger Bodamer, Eric Voss, and Jacco Draaijer, the disclosure of which is incorporated in its entirety herein by reference.

This application is related to commonly-assigned, application Ser. No. 08/880,325, filed Jun. 23, 1997, entitled "Apparatus and Method for Passing Statements to Foreign Databases by Using a Virtual Package," pending, inventors Roger Bodamer, Jacco Draaijer, Eric Voss, Raghu Mani, the disclosure of which is incorporated in its entirety herein by reference.

This application is related to commonly-assigned, application Ser. No. 08/880,327, filed Jun. 23, 1997, entitled "Apparatus and Method for Transparent Access of Foreign Databases in a Heterogeneous Database System,"," pending, inventors Roger Bodamer, Jacco Draaijer, Eric Voss, Raghu Mani, the disclosure of which is incorporated in its entirety herein by reference.

FIELD OF THE INVENTION

This invention relates to database systems and, more specifically, to an apparatus and method for calling external functions in a database system.

BACKGROUND OF THE INVENTION

Users can interact with many database systems by submitting Structured Query Language (SQL) statements to the database systems. SQL is a non-procedural language enabling users to describe a desired operation using reserved SQL commands. The database server then generates procedures based on the SQL commands to perform the desired operation.

One disadvantage of an SQL-based database system is that a user is generally limited to the operations supported by the standard sets of SQL commands. To provide increased flexibility, some database vendors have developed extensions to the SQL language. For example, the PL/SQL language developed by the Oracle Corporation provides a procedural language extension to SQL commands. Although users may invoke defined functions created using standard SQL or PL/SQL commands, conventional database systems do not enable users to invoke external routines, such as routines created using a third generation languages such as "C" or "C++".

Some database systems have attempted to enhance database capabilities by linking external routines directly to server processes, where the linked external routines are executed within the same address space as the server process. This arrangement suffers the disadvantage that the linking of the external routines inherently creates potential operating risks to the database system. For example, if a C program linked to the database server had an execution error, then the error during execution of the C program may result in crashing of the entire database system.

Some database systems have attempted to limit the harmful effects of linked external routines by preventing the external routines from accessing address space that is reserved for critical database server processes. In such cases, however, failures in the linked external routines may still adversely affect the server processes since the server process would need to carefully manage internal operations in order to keep the crash of the external routine from expanding into the database server. Thus, the prior art systems cannot guarantee that a database server will not crash during execution of a linked external procedure.

SUMMARY OF THE INVENTION

There is a need for an arrangement that provides full control over execution of external routines in a manner that enables users of a database system to access external routines without any risk of adverse effects to the database server.

There is also a need for an arrangement that enables recursive queries between a local database system and external routine while insulating the local database system from potential failures in the external routine.

There is also a need for an arrangement that enables execution of queries from the external routines back to the local database. These queries can result in another call to an external routine, resulting in another query, etc., resulting in recursive calls to external routines.

These and other needs are attained by the present invention, where a database server sends a request for execution of an external routine to an agent process executing in an address space separate from the database server, and completes execution of a client statement based on results received from the agent process.

According to one aspect of the invention, method for processing a request from a client includes the steps of receiving the request by a database server that is executing in a first address space, the request specifying an operation to be executed by the external routine necessary to execute the request, initiating a connection between the database server and an agent process that is executing in a second address space separate from the first address space, causing the agent process to execute the external routine to perform the operation; and processing the request by the database server based on results received from the agent process executing the external routine. Initiating a connection with the agent process executing in a separate address space enables the database server to provide enhanced capabilities to database clients without risking the database server process to the risk of a fault in the external routines. Moreover, the connection may be used by the agent process to send a query, necessary for execution of the external routine, to the database server, enabling recursive queries between the database server and the agent process during the same transaction processing the client request. Hence, the present invention enables calls to an external routine, followed by a callback (i.e., a query back to the local server process from the external routine), and a recursive callout (i.e., a call to an external routine resulting from a callback from an external routine).

According to another aspect of the present invention, a database server configured to respond to a statement includes a local server process receiving the statement from the client and configured for determining routines necessary for execution of the statement, and an interface configured for sending a request to execute an identified one of the routines to an agent process, the agent process executing in an address space separate from the local server process, the local server process completing execution of the statement based on results received from the agent process. The interface maintains a connection with the agent process to send and receive statements and data necessary for execution of the statement, enabling the local server process to access enhanced routines without risking operation of the local server process due to a failure in the agent process executing the external routine.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE PREFERRED EMBODIMENT

A method and apparatus for processing statements by executing external routines in separate agent processes is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
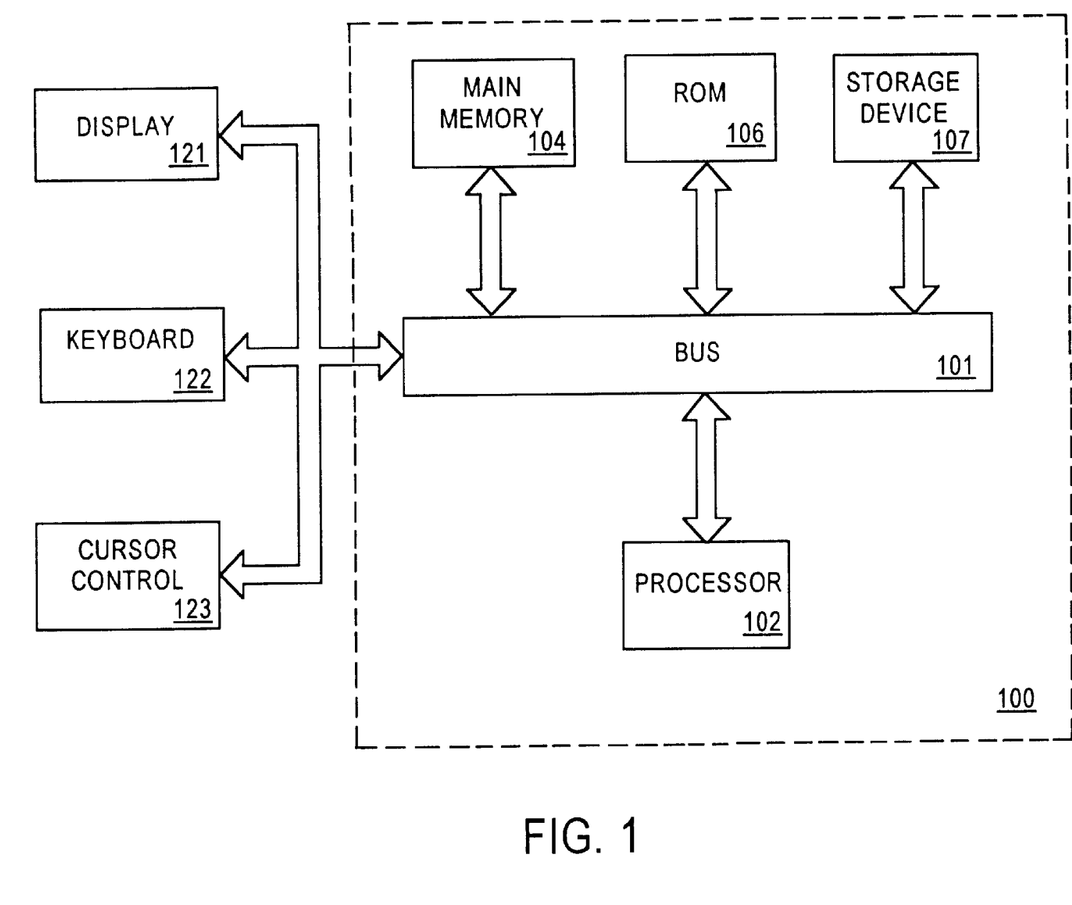
FIG. 1 is a block diagram of a computer system that may be used to implement an embodiment of the invention.

FIG. 1 is a block diagram of a computer system 100 upon which an embodiment of the present invention can be implemented. Computer system 100 includes a bus 101 or other communication mechanism for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. Computer system 100 further includes a keyboard 122 and a cursor control 123, such as a mouse. The present invention is related to the use of computer system 100 to process statements by accessing separate agents executing external routines. According to one embodiment, the processing of statements by accessing executing external routines is performed by computer system 100 in response to processor 102 executing sequences of instructions contained in memory 104. Such instructions may be read into memory 104 from another computer-readable medium, such as data storage device 107. Execution of the sequences of instructions contained in memory 104 causes processor 102 to perform the process steps that will be described hereafter. In alternative embodiments, hard-wired circuitry may be used in place of or in combination with software instructions to implement the present invention. Thus, the present invention is not limited to any specific combination of hardware circuitry and software.

HETEROGENEOUS ARCHITECTURE

Figure 2A:
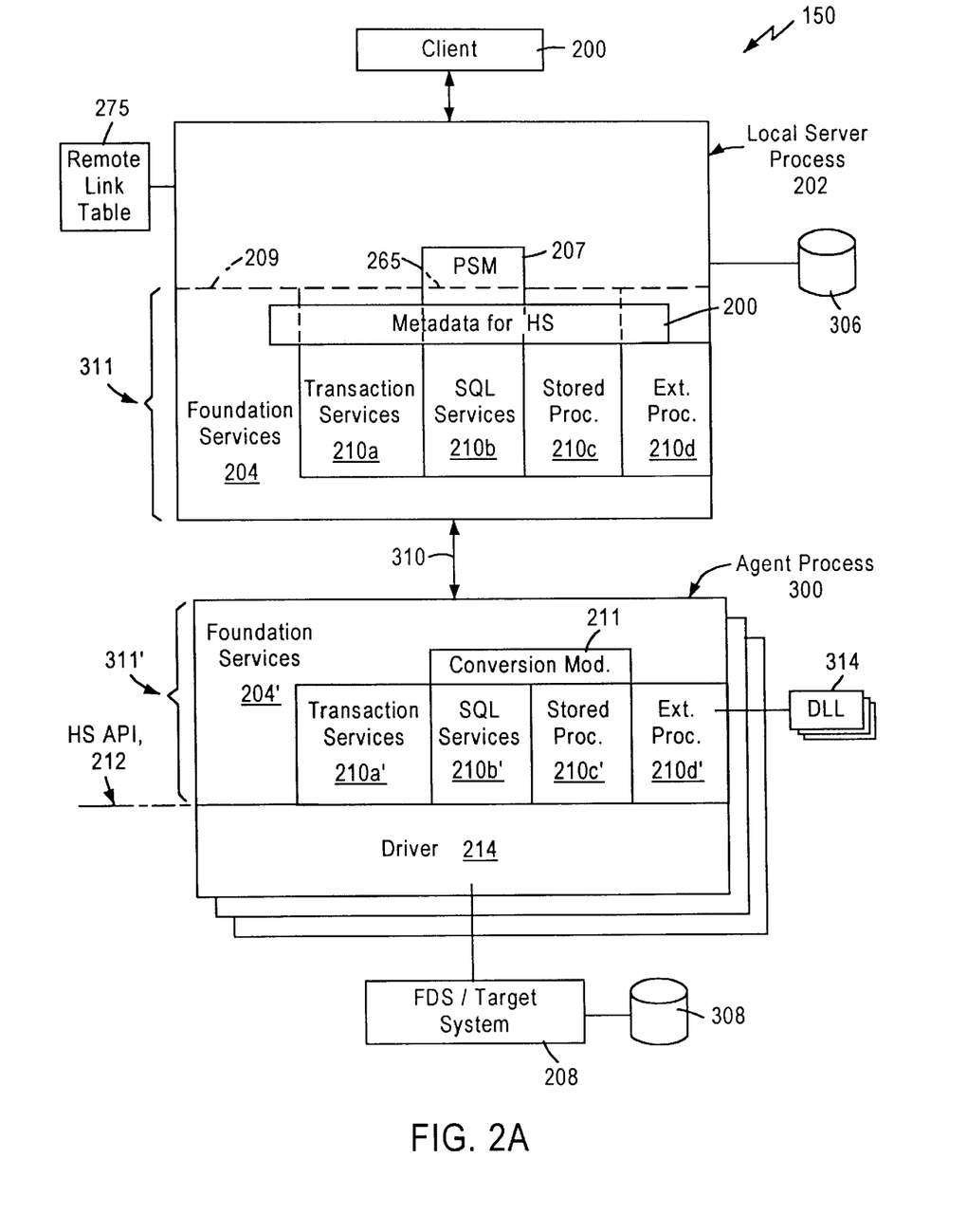
FIGS. 2A and 2B are diagrams summarizing a database server architecture for a heterogeneous database environment according to an embodiment of the present invention.
Figure 2B:
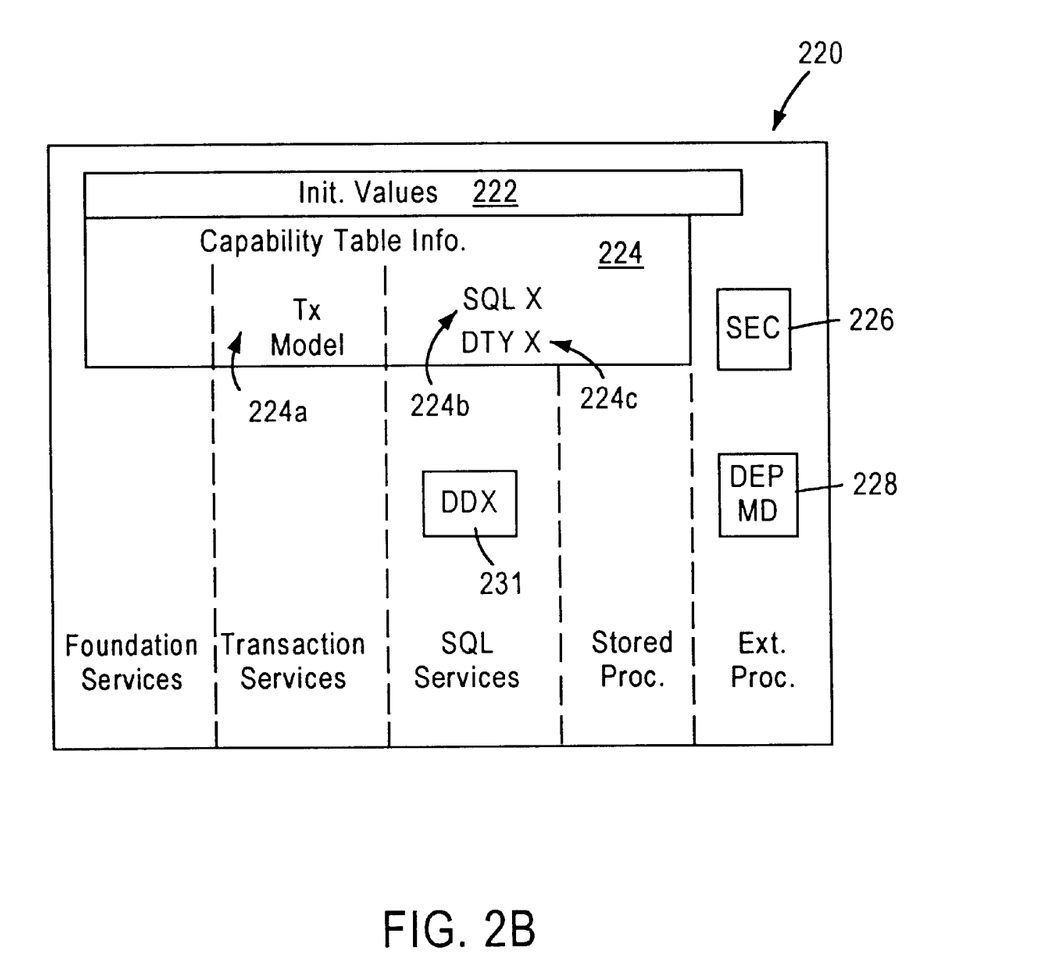

FIGS. 2A and 2B are diagrams summarizing an architecture for a database server process in a heterogeneous environment according to an embodiment of the present invention. FIG. 2A illustrates the overall architecture 150, and FIG. 2B illustrates a diagram of metadata definitions for use by the database server, described below. As shown in FIG. 2A, a client process 200, for example an application program, supplies a statement such as a SQL statement to a local server 202. The local server 202 includes routines for providing the basic services necessary for performing local server operations, for example memory services or context services. The local server 202 performs conventional query processing when processing native requests for data directly accessible by the local server 202, for example data stored in a local database 306. In a "homogeneous database system," the local server 202 can coordinate with a remote server from the same vendor in a distributed environment for coordinating commitments to respective transactions.

As described in detail below, the client statement may require an operation to be performed by a non-native (i.e., foreign) process, such as a foreign database server (FDS) 208 or an external routine. For example, the client statement may request data from a foreign database 308 under the control of a foreign database server 208. In this case, the local server 202 cannot complete execution of the statement without receiving the data from the foreign database server 208. Alternatively, the client statement may also include a request to be performed by the foreign database server 208 but without returning data, for example creating a new data table or updating data in the foreign database 308. The client statement may alternatively include a call to a procedure that is implemented by the foreign database server 208, but not by the local server 202.

The client statement may also call an external routine that extends the capabilities of the local server 202 beyond a standard set of commands. Specifically, users interact with many database systems by submitting SQL statements to the database systems. To supplement the functionality of a limited standard set of SQL commands, external routines (i.e., "extensions") can be coded, potentially by third parties, in a third generation language (3GL) such as C or C++. However, it is desirable to control the execution of the external routines to ensure that failures in the external routines do not adversely affect the local server 202. For example, a common bug in a C function de-references an invalid pointer and causes a segmentation fault, resulting in a crash.

The heterogeneous architecture of FIG. 2A includes heterogeneous services modules 311 and 311' that augment the distributed functionality of the local server 202 to enable non-native database servers 208 to be incorporated into the distributed architecture. The module 311 is executed in the local server process 311 and the module 311' is executed in an agent process 300. The local server process 202 communicates with the agent process 300 via a remote process mechanism in the foundation services 204. The foundations services 204 perform the basic services that are needed for processing heterogeneous operations. The basic services include memory handling, establishing the proper context (e.g., login and logoff), and the remote process mechanism. The remote process mechanism provides a framework that allows the local server 202 to operate in a heterogeneous environment (e.g., a distributed system having servers from different vendors).

The agent process 300 also enables external routines (e.g. C functions) stored in a dynamically-linked library (DLL) 314 to be executed without concern of crashing the local server 202. Thus, the agent process 300 provides an interface between the local server 202 and a foreign database server 208 that ensures that any operation of the foreign database server 208 will not adversely affect the local server 202. Furthermore, the agent process 300 may execute a driver 214, which has been provided by a third party such as the vendor of the foreign database server 208. Hence, the local server 202 is insulated from the routines executing in the agent process 300 to protect the local server 202. If the external routines executing in the agent process 300 are later deemed reliable or safe, the remote process mechanism can be removed and code for the agent process 300 can be linked directly into the local server 202.

The agent processes 300 are separate processes, started by the heterogeneous services 311 of the local server 202 and executed in an address space separate from the local server 202. Hence, the agent process 300 protects the local server 202 from crashes that may occur in the agent process 300 during execution of a non-native routine. In addition, the agent process 300 may be executed on a machine separate from the local server 202.

The heterogeneous services modules 311 and 311' enable the local server 202 to complete execution of client statements that require execution of non-native operations. Specifically, the local server 202, upon receiving a client statement having a database link to a remote process, will access a remote link table that is stored on the file system of the local server 202. The remote link table includes information that specifies how to a point to a communication link to a remote process based on the database link specified in the client statement. Specifically, the remote link table uses the database link as an alias to identify (1) the remote process executing on a remote machine, (2) link-related information such as network address, TCP/IP port number, etc., to find out exactly which process to connect to, and (3) whether the database link points to a foreign system. If the remote link table specifies that the referenced database link points to a foreign system, the local server 202 will invoke the heterogeneous services using the first heterogeneous services module 311 in the local server 202, which in turn invokes the second heterogeneous services module 311' in the agent process 300.

The first heterogeneous services module 311, which is built upon the foundation services 204, performs all possible operations that do not require the interaction of the external process. For example, the first heterogeneous services module 311 helps identify an operation necessary for execution of the client statement that must be executed by an external process (e.g., an external routine or a foreign database system), and forwards the identified operation to the appropriate agent process 300 via the identified remote path for execution. As described below, the first heterogeneous services module 311 includes specific services modules for controlling respective operations.

The agent process 300 includes foundation services 204' that complement the operations of the foundation services 204 in the local server 202. For example, the foundation services 204' maintains the communication path 310 with the local server 202 by handling the requests received from the local server 202 and sending results during execution of the agent process 300 to the local server 202. The communication path 310 can be a shared memory or other inter-process connection or a network connection. The second heterogeneous services module 311', which is built upon the foundation services 204', manages the operations requiring interaction with the third-party code, whether the third-party code is an external routine stored in the dynamically linked library 314, or a driver communicating with the foreign database server 208. Hence, the first heterogeneous module 311 will perform all operations that do not require an actual interface or interaction with third-party code, whereas the second heterogeneous module 311' will preferably perform only those operations associated with interacting with the third-party code, such as data translation between the conversion module 211 and the third-party driver 214 or execution of a third-party external routine from the library 314.

The first heterogeneous services module 311 includes a plurality of modules that enable the local server 202 to interact with the foreign processes via the appropriate agent process 300. Specifically, the heterogeneous services include a transaction services module 210a, a SQL services module 210b, a stored procedures module 210c, and an external procedures module 210d. As described below, the heterogeneous services in the local server 202 also include a passthrough SQL module (PSM) 207 that operates separately from the modules 210. Each of the modules 210a, 210b, 210c, and 210d, are built upon the foundation services 204, and are integrated with the local server 202 to use services within the local server 202, as shown by the dotted line 209 in the heterogeneous services.

The dotted line 209 refers to a native API interface, described below, used by the local server 202 to issue calls to a remote server. Instead of sending the API calls directly to the foreign database system 208, the heterogeneous services module 311 intercepts the calls to the foreign database system 208 and remaps the API calls by the local server 202 to a generic API 212. The heterogeneous services module 311 will then issue a remote procedure call to the agent process 300 to call a selected function in the driver 214. The agent process 300 will then call the selected function in the driver 214 (e.g., "parse").

Each of these modules 210 in the heterogeneous services module 311 is configured to map a particular database operation to a target foreign process based upon the operation specified in the client statement and based upon metadata definitions metadata for the heterogeneous services stored within a data dictionary 220, described below. As shown in FIG. 2B, the data dictionary 220 includes metadata definitions for use by the foundation services 204, as well as for the different modules 210 and 207.

The agent process 300 includes services and routines to carry out prescribed operations for the local server 202. Specifically, a plurality of different agents 300 can be initiated by the heterogeneous services of the local server 202 to interact with respective foreign database servers 208. For example, one agent 300a may interact with a Sybase database system, and another agent 300b may interact with an Informix database system, etc. Each agent 300 includes the foundation services 204' and a conversion module 211, described below. Each agent also includes a corresponding set of services modules 210a', 210b', 210c' and/or 210d' that correspond to the capabilities of the corresponding foreign database system. Hence, if a foreign database server 208 does not have transaction services, the corresponding agent 300 interacting with that foreign database server 208 will not need a transaction services 210a'. Alternatively, the transaction services 210a' may be available in the compiled code for the agent process 300 but unused because the metadata stored in the data dictionary 220 does not identify that foreign database system as supporting that service.

The conversion module 211 provides the data translation services necessary for converting from the data format native to the local server 202 to the data format of the target system 208. Three types of data type conversion are possible. In the first type, the conversion module 211 contains all the necessary conversion routines to convert from the native data type of the local server 202 to the data type of the target system 208. In the second type, the conversion module 211 converts from the native data format based on routines supplied by a driver 214, where the conversion routines within the driver 214 may be supplied, for example, by the manufacturer of the target system 208. In the third type, the native data type is described in terms of an intermediate data type to perform an n-step conversion. For instance, one of the steps is performed by a conversion originally supplied with conversion module 211 and another of the steps is performed by a conversion function registered by the driver 214. Regardless of the conversion type, the data type translation is performed in the agent process 300, transparent to the local server 202.

In the case of the third type of data type conversion, the driver 214 registers conversion routines having a predetermined prototype with the conversion module 211. The predetermined prototype specifies the number and type of the arguments of a conversion routine as well as the type of the return value, if it exists. Thus, the conversion module 211 sends data (i.e., an array of numbers) invokes a registered conversion routine of the driver 214 for translating the data to the format of the foreign database system. Alternatively, the driver 214 may specify an intermediate n-step conversion, where the conversion module 211 translates from the native data type to an intermediate data format specified by the driver 214, enabling the conversion routine of the driver 214 to convert from the intermediate data format to the internal format of the foreign database system 208. The intermediate date format can be an industry-standard data format, such as the ISO date format, to simplify the development of the driver 214 by third parties.

Thus, the local server 202 uses the heterogeneous services to output an operation request (e.g., an API call or an SQL statement) to a target foreign database (e.g., foreign database 208) by sending the request to the agent process 300. The conversion module 211 in the agent process 300 converts the data types to the format of the foreign database server 208, using internal conversion routines or registered routines supplied by the driver 214. Use of the agent 300 to execute registered routines supplied by the driver 214 thus protects the local server process 202 from crashes. The translated data in the foreign format is output from the agent process 300 to the foreign database server 208 to process the operation request. Once the foreign database server 208 generates results based upon processing the operation request, the data results are translated by the conversion module 211 to the data type of the local server 202 in accordance with the appropriate services module 210'. The local server 202 can then complete execution of the client statement based upon the results received from the foreign process 208b.

Thus, all the elements below the dotted line 209 and above the API 2121 are part of the heterogeneous services 311 and 311'. In summary, the heterogeneous services 311 and 311' include one fixed module (the foundation services 204 and 204'), and the four optional modules 210 and 210', depending on what type of product to be built.

FIG. 2B is a diagram illustrating a part of a data dictionary 220 providing metadata definitions for heterogeneous services. The data dictionary 220, stored in the local database 306, enables the local server 202 to determine how to process a received client statement. As described below, a foreign server 208 can be accessed either by referencing the specific foreign system, by referencing the heterogeneous services 210 configured to identify the appropriate foreign system, or by providing the local server 202 with definitions enabling the local server 202 to independently identify a call to a foreign server 208. The data dictionary 220 includes an initialization table 222 that specifies the information needed to startup and initialize an agent and connect it to a foreign database server 208. The initialization table 222 is used by all the services, including the foundation services 204, the transaction services 210a, the SQL services 210b, the stored procedures 210c, and the external procedures 210d. The values are defined partly by the heterogeneous services, and partly by the corresponding driver 214.

The data dictionary 220 also includes a capability table 224. The capabilities table 224 specifies the capabilities of the target system 208. For example, the capabilities table 224 includes a transaction services model 224a that describes the transaction model of the target system 208. Transaction models of target systems range from just read-only support at one end to full two-phase commit support at the other end. The SQL translations (SQL X) services model 224b provides SQL translation information on how to translate SQL functions in the local server 202 onto the functions of the target system 208 for the SQL services module 210b and the stored procedures module 210c, described below. The data type translations (DTY X) model 224c provides information on how to map foreign data types to data types native to the local server 202 for the SQL services module 210b and the stored procedures module 210c, as well as the conversion module 211.

The data dictionary 220 also includes a distributed external procedures security table (SEC) 226 and a distributed external procedures mapping data table (DEP MD) 228. The SEC table 226 stores information about users that have privileges to create, drop, alter, and/or execute a distributed external procedure, and the DEP MD table 228 contains information to map a PL/SQL function onto a distributed external procedure, such as a C function. The information in the DEP MD table 228 may include data types, number of arguments, the name of the function, indicator values, etc. Thus, the DEP MD table 228 stores metadata that is not relevant to the local server 202, but which is necessary to perform the distributed external procedure as it is passed to the agent process 300.

The data dictionary 220 also includes a data dictionary translation table (DDX) 231, described above, that contains a list of data dictionary table names and respective translation instructions for the data dictionaries in the foreign database system 208. The translation instructions will include the translation (mapping) information on how to map from the native data dictionary tables to the data dictionary tables of the foreign database system. Alternatively, if the foreign database system 208 does not include the corresponding metadata, the DDX 231 will include a mimic instruction for the corresponding mapping.

The data dictionary 220 enables the local server 202 to determine the relative capabilities of a target foreign server to process a statement in the agent process 300, and thus enables the local server 202 to call the appropriate services 210 to obtain the desired result.

In the case of regular external routines, the information is stored in the metadata for the local server 202 above the dotted line 209. This information is passed onto the HS 206a when an external routine is to be executed. This, the elements 226 and 228 are empty in this limited case of external procedures. However, in the case of distributed external procedures, the procedures are remote, and therefore the metadata about the foreign system 208 is used from data dictionary 220.

The heterogeneous services in the local server 202 of FIG. 2A are performed by modules 210 that are built upon the foundation services 204 and integrated with the local server 202. The SQL services module 210b, also referred to as a query services module, controls translation of SQL statements identified for execution by a foreign database server 208 to the corresponding foreign format. Specifically, assuming that the client statement includes a SQL statement recognized by the local server 202 as referencing data in a foreign database (e.g., foreign database "DB_A" 208a), the local server 202 parses the SQL statement into operations necessary for execution of the statement. The DTY X table 224c provides the data translations to translate the data object definitions. The SQL services module 210b obtains the mapping information from the DTY X table 224c, and sends the mapping information to the agent process 300 for the conversion module 211 to perform the data type translation.

Hence, all the translation information is stored in a table in the local database 308. The mapping information stored in the data type translation table 224c is then sent by the HS 311 to the agent 300 for data type translation.

The transaction module 210a is configured to coordinate transactions between the local server 202 and the corresponding foreign server 208, for example distributed transactions such as a two-phase commit transaction as performed in current commercially available Oracle database systems. Based on the capabilities specified in the capabilities table 224, the transaction module 210a can make transaction related calls, such as "begin transaction," "end transaction," and "commit," to the agent process 300. The corresponding module 210a' passes these generic transaction calls on to the driver 214, which maps the transactions calls into transaction calls appropriate for the target system 208.

The stored procedures module 210c is used to perform a "describe operation" dynamically for an operation within the client statement. Specifically, the local server 202 sends a request to the target system 208 to describe the specified operation, and will receive a response that describes the number and types of the parameters for performing the operation. For example, a procedure may be described as having five prescribed arguments. The response enables the stored procedures module 210c to determine how to use the SQL services module 210b for data type conversions. Thus, the stored procedures module 210c enables a function to be invoked at the target system 208 (via the agent process 300) by identifying the operation to be performed, specifying the arguments, and requesting that the operation be executed. This module is thus particularly helpful for executing stored procedures (e.g., fourth-generation (4GL) routines) in the target system 208.

The external procedures module 210d is configured to control execution of external procedures, also referred to as external routines, for which there is not a description of the function provided by a foreign database server 208, but rather is intended to be executed as an enhancement to the local server 202. In other words, the external routine is implemented as a C function that is incapable of describing itself. In this case, the metadata needs to be separately generated based on an analysis of the function and stored either in the local database for external procedures or in the DEP MD table 228 for distributed external procedures. Once the metadata for the external routine is available, the external routine can be called by causing the agent process to call the external routine from a specified address in the DLL 314, followed by passing of any necessary parameters to the agent process 300.

Thus, the difference between external procedures and stored procedures is that external procedures cannot describe themselves (number and type of arguments) and that the code for those procedures must be dynamically linked in, while stored procedures can describe themselves and, by being executed by a foreign system, does not need to be linked in.

The difference between external procedures and distributed external procedures is that external procedures are coded in a 3GL language (such as C or C++) for enhancing the functionality of local server 202. For example, external procedures can perform fast computations, manipulating the data received as arguments. Distributed external procedures, on the other hand, provide an alternative way to access foreign systems, for example through a 3GL API provided by the vendor of the foreign system. When users are updating both a foreign database 308 and the local database 302 at the same time, the operation must be transactionally safe. Hence, all transaction related operation go through the transactions services module, and the driver for the foreign system.

In summary, external procedures manipulate the data and perform calculations with in the DLL itself, to extend the functionality of the local server 202, while distributed external procedures invoke routines within the DLL, which access a 3GL API for a foreign system and the foreign system itself will then manipulate the data.

According to the disclosed embodiment, the local server 202 may selectively use any of the services modules 210a, 210b, 210c, or 210d to perform a certain operation. For example, the transaction services 210a may be used in combination with the SQL services 210b for a database gateway. The external procedures 210d may be used with the transaction services 210a for distributed external procedures.

Figure 3A:
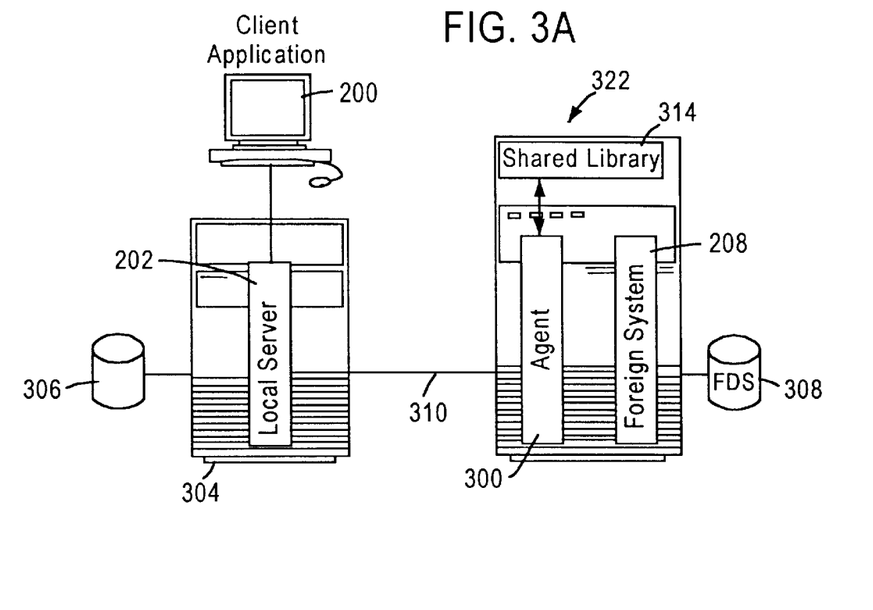
FIGS. 3A and 3B are diagrams illustrating alternative implementations of the database server architecture of FIG. 2 in a distributed environment.
Figure 3B:
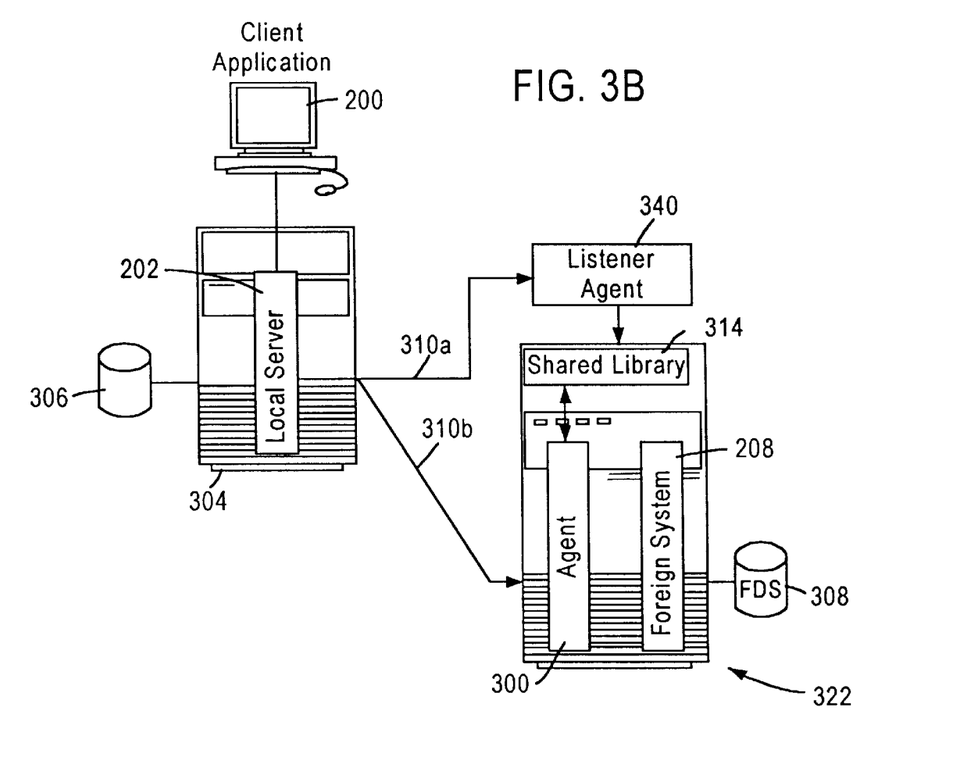

FIGS. 3A and 3B are diagrams illustrating exemplary implementations of the heterogeneous architecture of FIG. 2, with emphasis on the relationship between the local server process 202 and the agent process 300. In such an arrangement, the local server process 202 is executed in a first computing system 304 in a prescribed address space. An agent process 300 configured for performing external routines is executed in a second address space separate from the prescribed address space of the local server process 202, for example in a second computing system 322. The foundation services 204 (not shown in FIGS. 3A and 3B) establishes a network connection 310 with an agent process 300 in response to a call for an external routine by the statement received from the client application 200. As shown in FIG. 3A, the link 310 may be established by the local server process 202, or the link may be established indirectly as shown in FIG. 3B using another agent, for example a listener agent 340.

In the case of FIG. 3B, the listener agent is listening for incoming connections, and if one occurs it will spawn an agent and then hand over the connection to the agent. So once the agent process is spawned the listener is no longer part of the connection and the communication goes directly from the local server to the agent.

The agent process 300 accesses the appropriate external routine, stored in a dynamically-linked library 314. Specifically, the local server process 202 initiates the connection with the agent process 300, and causes the agent to execute the external routine stored in a dynamically-linked library 314 in order to perform the necessary operation. The agent process 300 executing the external routine thus communicates with the context module 210c which provides arguments for the agent process 300. The agent process 300 executes the operations specified by the local server process 202, for example by interacting with a foreign process 208 to obtain data from the foreign database system 308. As recognized in the art, FIG. 2A depicts a process architecture interacting with real data (depicted with respect to reference numerals 220, 306, and 308). Hence, the "foreign database system" is composed of elements 208 and 308, where element 208 is the process executing the actual database operations, and reference 308 is a representation of the actual data in the foreign database system.

External routines are created by a client application 200 creating the routine in a third generation language. The external routine is then archived in an operating system dynamically-linked library 314. The library 314 is then registered within the data dictionary table 220 within the local database 306, and the external routine is then registered within the data dictionary table 220 as stored in the dynamically-linked library 314.

Figure 4:
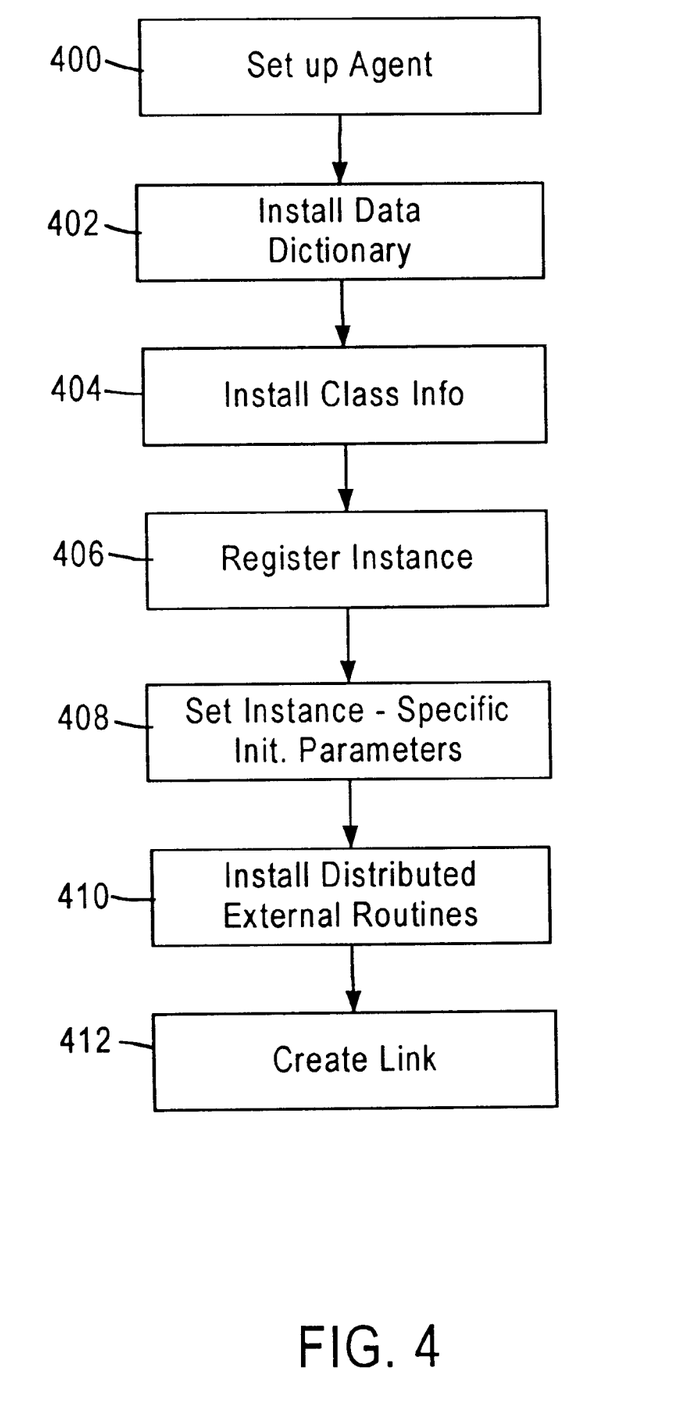
FIG. 4 is a diagram illustrating the steps of registering a foreign process to the database server architecture of FIG. 2.

FIG. 4 is a diagram illustrating steps to register a foreign process 208 with the local database server 202 for establishing the heterogeneous architecture of FIG. 2. A connection to the foreign system 208 or an agent process 300 is first established by registering an agent in step 400, enabling the foundation services 204 to set up a connection 310 with the corresponding foreign system. As recognized in the art, commercially-available listener agents such as the listener agent 340 can be configured to set up the agent processes based upon standardized API instruction sets. As described below, the listener agent 340 controls the initiation and connection of multiple agents to the local server process 202. Alternatively, the functions of the listener agent may be performed by the foundation services, as shown in FIG. 2A.

Once the listener agent 340 (or the foundation services 204) has been configured in a way to start up the agent process 300, the data dictionary 220 is installed in step 402 to include the identity and virtual location of the dynamically linked library (DLL) 314. Class information is then installed in step 404 that identifies the capabilities of the foreign system and the objects corresponding to the foreign system 208, respectively. The foreign system instance 208 is registered in step 406 with a new instance name and the class to be used to access the foreign system.

Instance-specific initialization parameters are then set in step 408 for each instance, for example a domain (virtual path) for a foreign system, a database name for the foreign system, an internal unique name used by the local server process 202 for creating distributed transaction identifications, language settings for the foreign system, the maximum number of cursors (i.e., assigned memory spaces) that can be open, and the ability of the foreign system to become a commit point site in a distributed transaction. Agent-specific initialization parameters may also be required, for example, connection information required to connect to a foreign system.

Once the instance-specific initialization parameters have been set in step 408, then any desired external routines are installed in the dynamically-linked library 314 in step 410. The network connection is then established in step 412 (e.g., a network connection 310) to test the access to the foreign processes 208.

PROCESSING STATEMENTS USING EXTERNAL ROUTINES

Figure 5:
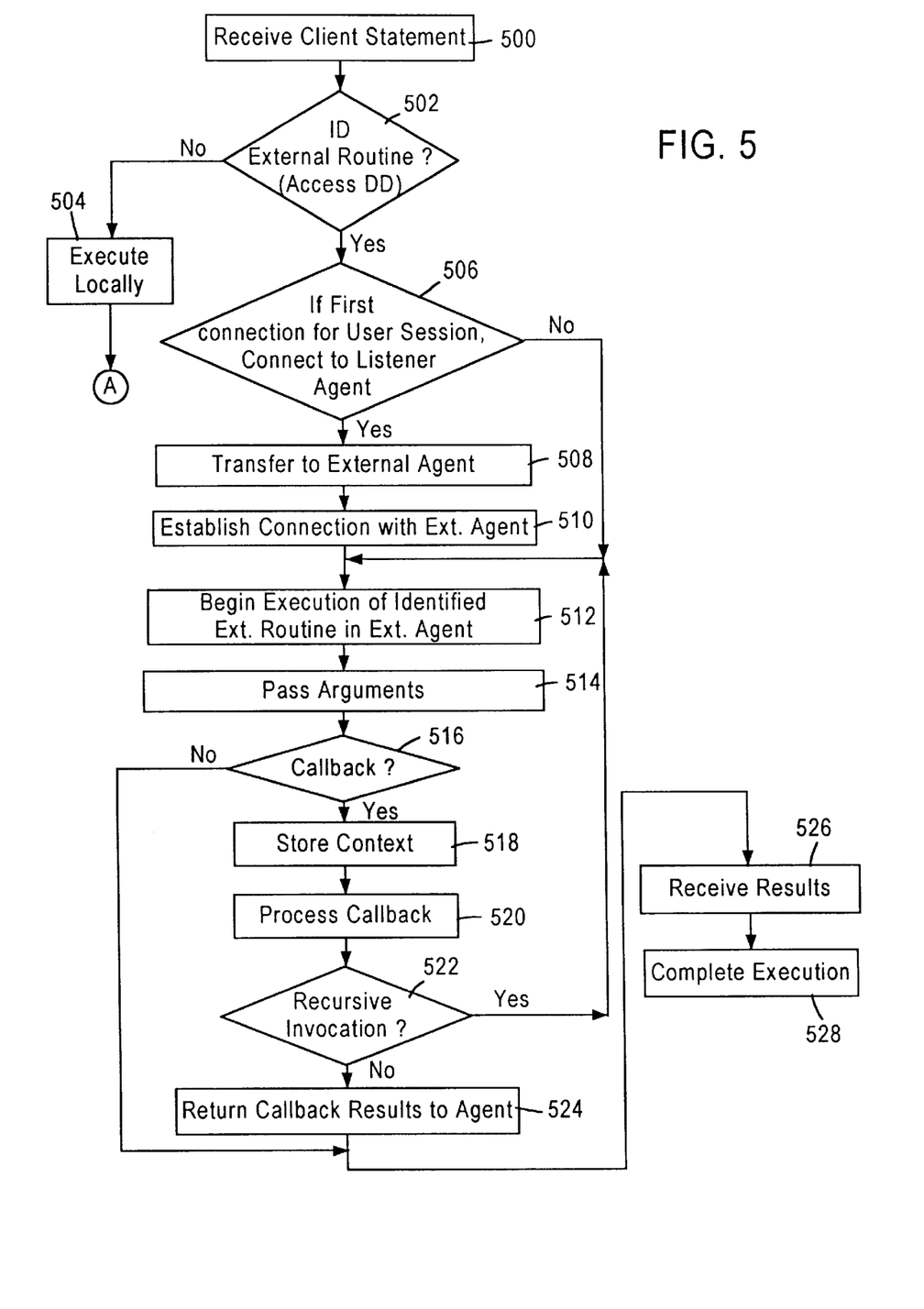
FIG. 5 is a diagram illustrating the method for processing a statement from a client according to an embodiment of the present invention.

FIG. 5 is a flow diagram illustrating a method for processing a statement from the client 200 according to an embodiment of the present invention. The steps of FIG. 5 illustrate external routines and distributed external routines functionality of the architecture of FIG. 2.

As shown in FIG. 5, the local server process 202 receives the statement, for example a SQL statement, in step 500 from the client 200. The local server process 202 checks in step 502 whether the client statement includes an external procedure call. Specifically, the local server process 202 checks either the local data dictionary (not shown) in the case of external routines, or the data dictionary 220 in the case of distributed external routines, to determine whether the client statement includes a registered external routine. As described above, the dynamically-linked library 314 is registered in the data dictionary 220, and each external routine stored in the library 314 is registered in the data dictionary 220 with respect to the library 314. If the client statement does not include a call to a remote external routine, the statement is executed locally by the local server process 202 in step 504 or passed to a remote server for processing in a distributed environment.

Upon detecting the statement as an external procedure call, the foundation services 204 calls the external routine. Specifically, the foundation services 204 creates a connection 310a with the listener agent 340 in step 506 that controls the initiation of a plurality of the agent processes 300 on the remote computing system 322. The listener agent 340 initiates the agent process 300, transfers the connection 310a between the listener agent and the foundation services 204 to the agent process 300 in step 508, and releases control of the connection to the foundation services 204 to form the connection 310b in step 510. The agent process 300 is started for the particular user, and the external procedures module 210d causes agent process 300 to begin execution of the identified routine in step 512. The agent process 300 accesses the dynamically linked library 314, and begins execution of the external routine. Preferably, connection 310a is only established at the first invocation of an external procedure in a user's session and maintained until the session is ended.

The agent process 300 then receives any necessary parameters from the foundation services 204 and/or the external procedures module 210d via the network connection 310b in step 514. Specifically, the appropriate module 310d (and 210a for distributed external procedures) converts the parameters to be supplied to the agent process 300 from a SQL data type to the data type native to the external routine (e.g., C or C++).

During execution of the external routine in the agent process 300, the agent process 300 may issue a callback query to the foundation services 204, where the external routine executed by the agent process 300 requires an operation to be performed by the local server 202. In other words, the external routine may generate its own query to the database server 202. If the foundation services 204 receives a callback in step 516, the local server process 202 stores the context (i.e., state) of the execution of the client statement in step 518, and executes the callback query in step 520. For example, the callback query may be a SQL statement generated by the agent process 300 in order to complete execution of the external routine. The local server process 202 may be able to execute the callback query, for example by accessing the local database 306, and send back the callback results in step 524 (as shown by the dashed lines between steps 520 and 524).

However, the local server process 202 may need to generate a another call to an external routine (i.e., a recursive invocation of an external routine) query to the agent process 300, or alternatively initiate execution of another agent process 300' to execute a second external routine. Hence, the local server process checks in step 522 if the callback results in recursive invocation of an external routine. During this time, the context module 210c monitors the current context and determines if another callback (i.e., a recursive invocation of an external routine) is received in step 516 in response to the callback in step 522. If a recursive invocation is required, then steps 512 et. seq. are repeated for the recursive invocation of the external routine, until all callbacks are completed. Hence, the local server process 202 and the agent process 300 may execute a plurality of recursive external routine invocations between each other. Thus, the callback queries are performed within the same user session as corresponding to the request from the client 200. Moreover, the queries are performed not only within the same user session, but also in the same user transaction with reuse of the same connection.

After the callback is completed by the local server process 202, the results are sent to the agent process 300 in step 524. If the agent issues no further callback queries, the local server process 202 receives the results from execution of the external routine by the agent process 300 in step 526, and the local server process 202 completes execution in step 528 based upon the received results. According to the disclosed embodiment, completion of the client's session (comprising one or statements for the client 200) results in the connection 310 between the local server process 202 and the external agent process 300 to be torn down, although the agent process 300 may be maintained and reinitialized for subsequent requests, if desired.

The distributed external procedures module 210d coordinates transactions with the agent process 300 in the event that the agent accesses the foreign database system FDS 308, for example to update data. Since the update operation by the agent process 300 may be supported by transaction management, the external procedures module 210d coordinates commit points with the transaction module 210a to enable the local server process 202, the foreign database system 308 (via the agent process 300) and another foreign system 208b (via API 212) to synchronously commit the distributed transaction, or roll back to the state prior to the distributed transaction.

In the embodiment described above, a respective agent process 300 is spawned for handling the external procedure requests for each user session. In an alternative embodiment, however, only one agent process 300 is spawned for handling the external procedure requests for all user sessions of the local server 202.

The techniques described herein provide an architecture with scaleable, efficient, transparent access to data and controllable execution of external routines in a heterogeneous database environment. The heterogeneous services module provides a framework that allows for translation and transaction services to operate in a heterogeneous environment, where specialized modules provide dynamic translation services for respective database operations.

The disclosed architecture also provides reliable execution of processes without risking the local server process operation by providing a plurality of agents executing in separate address spaces that communicate with the local server process via a network connection. Hence, if a fault occurs in a foreign process or the agent process 300, the link with the faulty process can be terminated without adversely affecting the local server process.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for processing a request from a client, comprising the steps of:

receiving the request by a database server that is executing in a first address space, the request specifying an operation to be executed by an external routine, wherein execution of said operation is necessary to execute the request;

in response to the request, initiating a connection between the database server and an agent executing in a second address space separate from the first address space;

causing the agent to execute the external routine to perform the operation; and processing the request by the database server based on results received from the agent executing the external routine.

2. The method of claim 1, further comprising registering the external routine with the database server by:

describing at least one argument of the external routine;

creating a new procedure that specifies the at least one argument and a path to the external routine; and storing in a database table the new procedure.

3. The method of claim 2, wherein the step of registering an external routine with a database server further includes:

creating a library for storing paths to locate respective stored external routines; and storing said path to the external routine in the library.

4. The method of claim 1, wherein the step of initiating a connection between the database server and an agent includes the steps of establishing a link with a listener agent external to the database server;

causing the listener agent to transfer the link between the database server and the listener agent to the agent executing in the second address space to form said connection.

5. The method of claim 4, further comprising the step of initiating a new instance of said agent.

6. The method of claim 5, further comprising initiating another new instance of said agent in response to reception by the database server of a second request from a second client including an operation to be performed by one of the external processes.

7. The method of claim 5, further comprising initiating another new instance of said agent in response to the request including another operation to be processed by another one of said external processes.

8. The method of claim 1, wherein the step of causing the agent to execute the external routine includes:

passing arguments corresponding to the operation to the agent for processing by the agent;

receiving a first SQL statement from the agent during execution of the external routine;

processing the first SQL statement within a same database instance executing the step of processing the request; and returning results from processing the first SQL statement back to the agent for processing of the operation.

9. The method of claim 8, wherein the step of receiving an SQL statement comprises receiving the first SQL statement from the agent via said connection.

10. The method of claim 8, further comprising suspending processing of the request in response to receipt of the first SQL statement.

11. The method of claim 10, further comprising sending a second invocation of an external routine to the agent for processing of the first SQL statement.

12. The method of claim 8, further comprising:

receiving a plurality of recursive invocations of external routines from the agent during execution of the external routine; and recursively processing the plurality of SQL statements from the agent within the same database instance, each recursive processing performed within a common connection and within a common transaction.

13. The method of claim 1, further comprising registering the external routine with the database server.

14. A computer readable medium having stored thereon sequences of instructions for responding to a request for performance of an operation received by a server, the sequences of instructions including instructions for performing the steps of:

receiving the request by a database server that is executing in a first address space, the request specifying an operation to be executed by an external routine, wherein execution of said operation is necessary to execute the request;

in response to the request initiating a connection between the database server and an agent executing in a second address space separate from the first address space;

causing the agent to execute the external routine to perform the operation; and processing the request by the database server based on results received from the agent executing the external routine.

15. A database system configured to respond to a statement, comprising:

a local server process receiving the statement from the client and configured for identifying routines necessary for execution of the statement, the local server process including an interface configured for sending a request to execute an identified one of the routines; and an agent process configured for executing the identified routine in an address space separate from the local server process, the local server process completing execution of the statement based on results received from the agent process.

16. The database system of claim 15, further comprising a dynamically-linked library storing a plurality of foreign routines executable by the agent process, the agent process selectively executing the identified one of the routines in response to reception of the request.

17. The database system of claim 16, wherein the dynamically-linked library is a dynamically linked library (DLL), the agent process selectively receiving arguments necessary for execution of the identified one of the routines.

18. The database server of claim 16, further comprising a listener agent configured for initiating execution of the agent process, wherein:

the interface is configured for establishing a connection to the listener agent to send the request, and the listener agent is configured for selectively transferring the connection with the interface to the agent process for execution of the identified one routine.

19. The database system of claim 16, further comprising a database table for storing identifiers specifying the foreign routines, respectively.

20. The database system of claim 19, wherein the local server process identifies the identified one of the routines as a foreign routine executable by the agent process in response to accessing the database table, wherein the statement includes the corresponding stored identifier.

21. The database system of claim 15, wherein:

the interface is configured to receive a second recursive invocation of an external routine from the agent process necessary for execution of the identified one routine by the agent process; and the local server process is configured for executing the second recursive invocation of an external routine within a same database instance executing the statement and returning second results for the second recursive invocation of an external routine to the agent process.

22. The database server of claim 21, wherein:

the agent process is configured to store a context stack for executing external routines recursively; and the local server is configured to store a context stack for processing multiple statements from the agent process within the same database instance.

* * * * *